(12) United States Patent
Parzysz et al.

(10) Patent No.: US 11,882,532 B2
(45) Date of Patent: Jan. 23, 2024

(54) METHOD FOR PLACING A BASE STATION ON STANDBY, COMPUTER PROGRAM PRODUCT, DEVICE, CORRESPONDING BASE STATION AND SIGNAL

(71) Applicant: ORANGE, Issy-les-Moulineaux (FR)

(72) Inventors: Fanny Parzysz, Chatillon (FR); Yvon Gourhant, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 16/976,341

(22) PCT Filed: Feb. 20, 2019

(86) PCT No.: PCT/FR2019/050384
§ 371 (c)(1),
(2) Date: Aug. 27, 2020

(87) PCT Pub. No.: WO2019/166716
PCT Pub. Date: Sep. 6, 2019

(65) Prior Publication Data
US 2021/0045072 A1 Feb. 11, 2021

(30) Foreign Application Priority Data
Feb. 28, 2018 (FR) ...................................... 1851768

(51) Int. Cl.
*H04W 56/00* (2009.01)
*H04W 72/0446* (2023.01)
(52) U.S. Cl.
CPC ....... *H04W 56/00* (2013.01); *H04W 72/0446* (2013.01)

(58) Field of Classification Search
None
See application file for complete search history.

(56) References Cited

U.S. PATENT DOCUMENTS

| | | | | |
|---|---|---|---|---|
| 5,809,015 A | * | 9/1998 | Elliott | H04B 7/2643 370/280 |
| 2005/0030927 A1 | * | 2/2005 | Mucke | H04J 4/00 370/336 |

(Continued)

OTHER PUBLICATIONS

International Search Report dated Apr. 5, 2019 for corresponding International Application No. PCT/FR2019/050384, filed Feb. 20, 2019.

(Continued)

*Primary Examiner* — Faruk Hamza
*Assistant Examiner* — Cassandra L Decker
(74) *Attorney, Agent, or Firm* — David D. Brush; Westman, Champlin & Koehler, P.A.

(57) ABSTRACT

A method for controlling a base station of a radiocommunications network multiplexing data in time intervals, each having at least one synchronization time portion and at least one user data time portion organized in time-distributed and frequency-distributed blocks of resources. The method includes, for at least certain of the time intervals: dividing the user data time portion into at least two sub-portions, one active time sub-portion, capable of grouping together resource blocks to be sent out, and at least one time sub-portion that contains no resource blocks used, called an inactive time sub-portion; and putting the base station to sleep for at least one part of the duration of the inactive time sub-portion or sub-portions.

9 Claims, 8 Drawing Sheets

(56) References Cited

U.S. PATENT DOCUMENTS

| | | | |
|---|---|---|---|
| 2005/0107134 A1* | 5/2005 | Morioka | H04L 12/12 455/574 |
| 2007/0165728 A1* | 7/2007 | Parizhsky | H04W 56/003 375/260 |
| 2008/0037570 A1* | 2/2008 | Kim | H04W 52/0225 370/406 |
| 2012/0170498 A1* | 7/2012 | Gustavsson | H04W 52/40 370/350 |
| 2013/0070635 A1 | 3/2013 | Suo et al. | |
| 2014/0036812 A1* | 2/2014 | Malladi | H04L 5/001 370/329 |
| 2014/0219150 A1* | 8/2014 | Lee | H04W 52/0206 370/311 |
| 2015/0109975 A1* | 4/2015 | Wei | H04L 5/14 370/280 |
| 2015/0223162 A1 | 8/2015 | Zhang | |
| 2015/0305024 A1* | 10/2015 | Rosa | H04W 48/16 370/329 |
| 2015/0365201 A1* | 12/2015 | Lunttila | H04L 5/005 370/329 |
| 2016/0205623 A1* | 7/2016 | Uchiyama | H04W 52/0206 370/311 |
| 2017/0156176 A1* | 6/2017 | Bergquist | H04W 52/0216 |
| 2017/0347297 A1* | 11/2017 | Li | H04W 74/0808 |
| 2018/0007688 A1* | 1/2018 | Fu | H04W 72/0446 |
| 2018/0242318 A1* | 8/2018 | Christensson | H04W 72/52 |
| 2018/0359781 A1* | 12/2018 | Yoon | H04W 72/20 |
| 2019/0075006 A1* | 3/2019 | Yi | H04W 72/0446 |
| 2020/0100221 A1* | 3/2020 | Tang | H04J 11/0076 |
| 2020/0229152 A1* | 7/2020 | Park | H04L 5/0044 |

OTHER PUBLICATIONS

Written Opinion of the International Searching Authority dated Apr. 5, 2019 for corresponding International Application No. PCT/FR2019/050384, filed Feb. 20, 2019.

CMCC., "NR Network Energy Requirement", vol. RAN WG2, No. Nanjing, China; May 23, 2016-May 27, 2016, May 22, 2016 (May 22, 2016), 3GPP Draft; R2-163875 NR Network Energy Requirement, 3rd Generation Partnership Project (3GPP), Mobile Competence Centre; 650, Route Des Lucioles; F-06921 Sophia-Antipolis Cedex; France, Retrieved from the Internet: http://www.3gpp.org/ftp/Meetings_3GPP_SYNC/RAN2/Docs/ [retrieved on May 22, 2016] XP051105259.

Debaillie et al., "A Flexible and Future-Proof Power Model for Cellular Base Stations", IEEE VTC Spring, 2015.

Salem et al., "Advanced Sleep Modes and their impact on flow-level performance of 5G networks", Sep. 2017.

English translation of the Written Opinion of the International Searching Authority dated Apr. 12, 2019 for corresponding International Application No. PCT/FR2019/050384, filed Feb. 20, 2019.

* cited by examiner

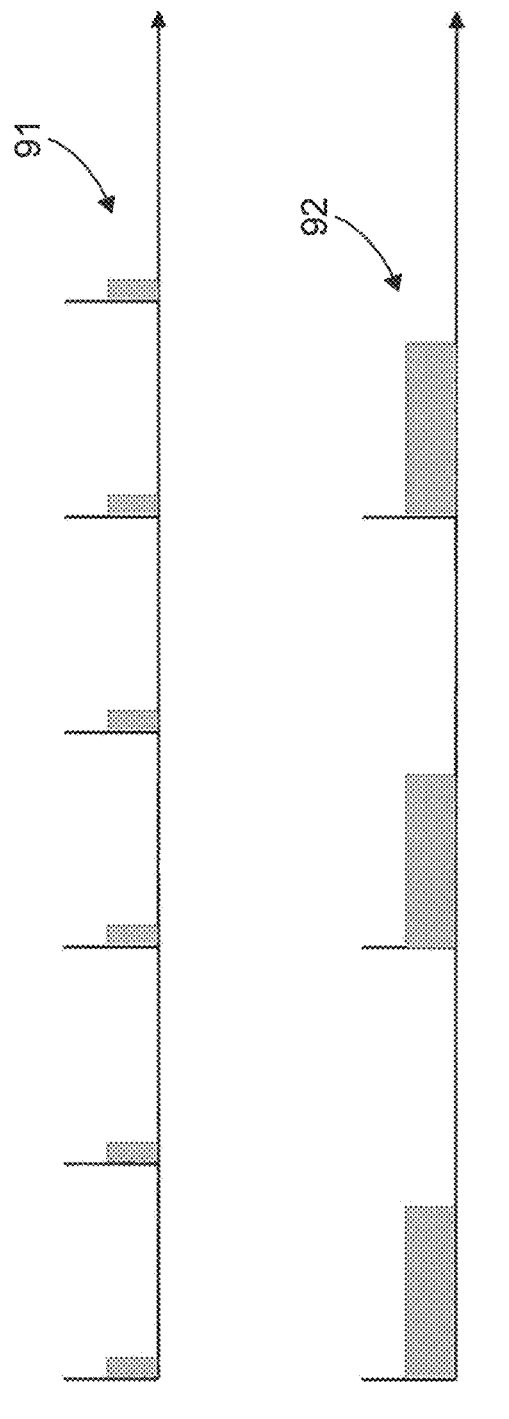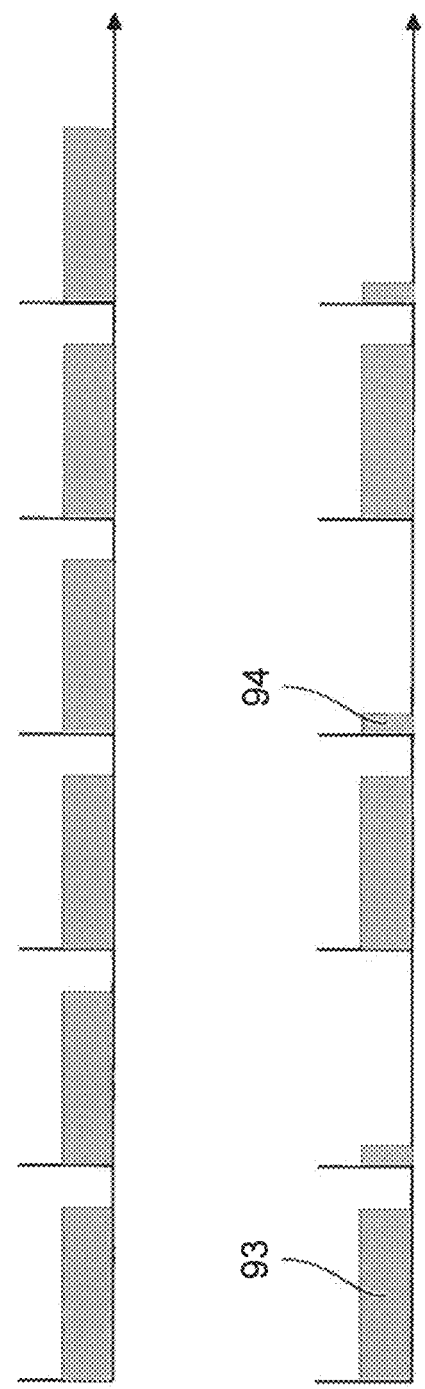
Figure 9a   Figure 9b   Figure 9c

METHOD FOR PLACING A BASE STATION ON STANDBY, COMPUTER PROGRAM PRODUCT, DEVICE, CORRESPONDING BASE STATION AND SIGNAL

CROSS-REFERENCE TO RELATED APPLICATIONS

This Application is a Section 371 National Stage Application of International Application No. PCT/FR2019/050384, filed Feb. 20, 2019, which is incorporated by reference in its entirety and published as WO 2019/166716 A1 on Sep. 6, 2019, not in English.

1 TECHNICAL FIELD

The field of the invention is that of the implementing of radiocommunications networks and especially the base stations of such networks.

The invention relates more particularly to optimizing the energy efficiency of a base station of a radiocommunications network.

The invention finds various applications, especially but not exclusively in the field of mobile radiocommunications networks, for example cell networks compliant with the 3GPP (3rd Generation Partnership Project) of the latest generations or future generations.

2 TECHNOLOGICAL BACKGROUND

In developed countries, the increasing density of networks and the proliferation of multi-functional mobile type terminals (smartphones) and other connected devices or connected objects are leading to a major rise in energy consumption for terminals as well as for base stations (for example "Nodes B" according to the UMTS (Universal Mobile Telecommunications System), "eNB" (evolved Node B) according to the LTE (Long Term Evolution) or "gNB (next Generation Node B) according to the 5G standard undergoing standardization). The energy cost for maintaining such a network remains high even during low-load or off-peak times, especially at night.

Besides, the emerging countries are still suffering from low coverage and uncertain electrical supply, which may lead to slowdowns or even cut-offs in the service provided by a base station.

Approaches have therefore been proposed for the energy management of the network part, especially base stations. For example, the on-demand activation of base stations offers a radical solution to reducing the energy consumed during low-load times. However, this requires putting base stations in sleep-mode for lengthy periods because of the substantial amount of time required to restore connections and carry out reception handovers or offloading from one base station to another. In addition, it can only be applied to dense networks (dense in terms of number of base stations in a given territory) that enable a base station to transfer its load to one or more other nodes serving a same geographical zone.

Other solutions have been proposed to overcome these problems. We can cite for example techniques for waking up the base station through a third-party interface (for example by a LoRa® system), when it is not possible to offload to another station or when setting up discontinuous transmission or DTX cycles. However, such solutions can be applied only when the base station has no terminal to manage. Thus, a gNB base station serving only one terminal (even for a voice service) must remain active and therefore cannot pass into sleep mode according to these known methods.

Besides, it can be noted that sleep modes have been proposed for terminals, on the one hand by acting on the high layers, especially the applications level, and on the other hand by putting the radio interfaces of the terminals into sleep-mode as a function of the user traffic or battery constraints.

However, these techniques cannot be applied to base stations that manage multiple users, in both sleep mode and connected mode. Indeed, in a base station, a certain number of signals must be transmitted regularly and continuously even if the cell is totally empty. The broadcasting of signals, especially synchronization signals, remains the major obstacle to the application to base stations of sleep modes developed for mobile terminals.

Energy efficiency remains an essential challenge in designing telecommunications systems and especially the base stations of tomorrow. There is thus a need for a solution for optimizing of the energy consumption of a base station.

3 SUMMARY

Thus, according to a first aspect, the invention relates to a method for controlling a base station of a radiocommunications network multiplexing data during time intervals each having at least one time portion called a "synchronization" portion and at least one time portion called a "user data" portion organized in time-distributed and frequency-distributed resource blocks. The synchronization time portion comprises, among others, the signals intended to keep the network functional, especially synchronization signals. The user data portion comprises, among others, the data intended for at least one terminal and the dedicated signaling (channel estimation, messages for setting up connections, etc.).

According to the invention, the method comprises, for at least certain of said time intervals:
  a step for dividing said user data portion into at least two sub-portions, one active time sub-portion, capable of grouping together resource blocks to be emitted, and at least one time sub-portion that contains no used resource block, called an inactive time sub-portion,
  a step for putting said base station into sleep-mode for at least one part of the duration, in particular throughout the duration (or at the very least for a maximized duration) of said inactive time sub-portion or plurality of said inactive time sub-portions (which can extend over several tens of milliseconds), and
  a step for modifying the total duration of said time intervals, the number of time slots forming said time intervals being chosen so as to be an integer sub-multiple of a maximum number $N_T^{max}$ of time slots.

Thus, the invention proposes a novel and inventive solution to minimize the energy consumption of a base station even in the event of a non-zero load, i.e. even when the base station in question manages one or more active terminals. The succession of a synchronization time portion, an active sub-portion and an inactive sub-portion forms a gDTX (next-generation Discontinuous Transmission) cycle.

To this end, the behavior of the base station is controlled, and sleeping periods are introduced after the data to be transmitted has been organized in an adapted manner. The periodic broadcasting of the synchronization signals (accompanied if necessary by signaling signals dedicated to the maintenance of the network), stipulated by a given standard implemented by the base station in question, can be maintained (5G for example) but, by contrast, the broadcasting of the data portion can be interrupted on a part of the duration of a time interval (several milliseconds or tens of milliseconds), the base station going into sleep mode and thus saving energy. This enables a shutdown of a large number of components of the base station and makes it possible to approach the energy consumption level of a base station that is shut down and in which only the wake-up functions are still active.

The periodic broadcasting of network maintenance signaling, especially synchronization signals, during the synchronization time portion defines these time intervals (i.e. the duration between two broadcasts of this signaling, which can be variable in certain embodiments) during which the terminals can be served by the base station.

Besides, the resource blocks used by the different terminals managed by the station are grouped together with the resource blocks dedicated to the broadcasting of the synchronization signals. This means that an inactive time sub-portion is prepared, the duration of which can be variable (for example as a function of operational parameters such as a limit on energy supply for the base station, for example if it depends on solar or wind electrical power supply) during which the base station can be put to sleep-mode so as to reduce its consumption without impacting the global service obtained in the cell managed by the base station or at least minimizing such an impact.

According to one particular embodiment, the method comprises a step for distributing a set of resource blocks carrying data of a user data portion to be sent in said active sub-portion. This step can especially be implemented by a scheduler known per se.

The active sub-portion can be set so as to be wide enough to allow for the different actors to have a reasonable flexibility for developing their own scheduling algorithms.

The method comprises a consequent updating of the duration for which the base station is put to sleep.

Thus, the duration of the inactive sub-portion is updated, either for an implementation directly during the current time interval (i.e. the time interval that comprises the given synchronization portion) or during a following time interval.

More particularly, the method comprises a step of modification of the number of time slots $N_T$ forming a time interval.

Thus, the duration of the time intervals can be adapted, for example to operational conditions of the base station. This aspect which is known per se especially in the 3GPP standard proves to be an efficient complement to the general approach of the invention.

Indeed, two values are then dynamically optimized: the number $N_T$ of time slots of a time interval on the one hand, and the number N of time slots during which the base station can be put into sleep-mode (i.e. the time slots forming the inactive time portion) on the other hand. The base station therefore must be active only during $N_T$–N time slots of the time interval.

More particularly, during the step of modification of the total duration of said time intervals, the number of time slots forming said time intervals is chosen so as to be an integer sub-multiple of a maximum number $N_T^{max}$ of time slots.

Thus, for a duration of a time interval selected from among a set of authorized durations (predefined in a standard), a broadcasting of the synchronization signals at fixed instants continues to be obtained periodically (i.e. at instants corresponding to multiples of $N_T^{max}$). Hence, an apparatus seeking to get synchronized with the base station for very lengthy periods, for example periods of one or more hours, is nevertheless sure of being active at the same time as the base station.

According to a first approach of this particular embodiment, the method comprises, after a modification of the number of time slots, a step of adaptation of the duration of the current sub-portions.

Thus, to keep the broadcasting of the synchronization signals at fixed instants (i.e. instants corresponding to multiples of $N_T^{max}$) despite the changing of the duration of the time intervals, the duration of a transition interval is adapted, such an adaptation possibly corresponding either to an increase or to a decrease in the number of time slots.

According to a second approach of this particular embodiment, the method comprises a step for delaying the application of a new duration of the inactive sub-portion, the modified number of time slots replacing the current number of time slots only q time intervals later, q being determined so as to keep a broadcasting of the synchronization signals at fixed instants.

Thus, the periodicity of the emission of the synchronization portion is kept through the implementing of a time offset for taking the modified duration into account.

For example, in one particular implementation, said base station broadcasts said synchronization portions every $N_T^{max}$ time slots starting from a given time reference and, at a given instant, updates the number of time slots contained in a time interval. The current number of time slots $N_T$ and the modified number of time slots N'T are such that $N_T^{max}=k*N_T$ and $N_T^{max}=m*N'T$, k and m being integers, and the updating takes place at a $p^{th}$ successive application of the method of control implementing said current number $N_T$ of time slots. The modified value $N'_T$ is applied only after q supplementary time intervals constituted by $N_T$ time slots and, for the remaining K time intervals. K and q are two integers such that $kN_T=(p+q)N_T+KN'_T$ and $mN'_T=(p+q)N_T+KN'_T$. K=0 and q=k−p if such integers do not exist.

According to particular implementations, one or more criteria for updating durations of time intervals can be taken into account. For example, the step for determining and/or the step for modifying can especially take into account at least one operating parameter belonging to the group comprising:
  a request for reception handover sent by at least one terminal to said base station;
  a signaling of request or of end of communications sent by at least one user terminal to said base station; and
  an external parameter influencing the radio-broadcasting capacity of said base station.

Thus, the durations of activity and of sleep-mode of the base station take account current operational conditions of the base station.

The number N of time slots forming said inactive sub-portion and/or the number $N_T$ forming a time interval is fixed in taking account at least one of the pieces of information belonging to the following group:
  guaranteed service time;
  type of traffic to be transmitted;
  availability in electrical energy.

In particular, it is possible to optimize the overall duration of the sleep-mode, in taking account different types of traffic to constantly adapt the values of N and/or of $N_T$.

According to one particular embodiment, an active time sub-portion is placed in time immediately before and/or after a synchronization portion.

Thus, the duration for which the base station is put into sleep mode is maximized. The base station is active (it is not in sleep-mode) for the duration corresponding to the synchronization portion and to the active time sub-portion and it is inactive (in sleep-mode) for the inactive time sub-portion.

According to one particular embodiment, when a terminal makes a request for starting or ending communications, or a request for transfer, to the network and when this request can be handled by said base station or at least another base station, the method implements a step of choosing a base station for communicating with said terminal, taking into account the distribution between the active and inactive sub-portions in at least one of said base stations.

Thus, it is possible to implement an overall optimization of the cycles on several base stations and/or several users.

The periods of sleep mode of the base stations of the network can be optimized jointly so as to obtain an overall optimizing of energy consumption of the network in question.

The invention also relates to a computer program product comprising program code instructions for the execution of the steps of the method for controlling a base station of a radiocommunications network as described here above.

As the case may be, this computer program can be present in a base station, in a controller controlling several base stations or it can be implemented in a virtualized manner. It can also be distributed among these different elements.

The invention also relates to a device for controlling a base station of a radiocommunications network multiplexing data in time intervals each having at least one synchronization time portion and at least one user data time portion organized into time-distributed and frequency-distributed resource blocks. Such a device comprises especially means for dividing said user data time portion into at least two sub-portions, one active time sub-portion capable of grouping together resource blocks to be sent out and at least one time portion not containing any used resource blocks, called an inactive time sub-portion, means for putting said base station in sleep-mode, during at least one part of the duration of said inactive time sub-portion or sub-portions and means for modifying the total duration of said time intervals, the number of time slots forming said time intervals being chosen so as to be an integer sub-multiple of a maximum number $N_T^{max}$ of time slots.

It will be noted here that, depending on the implementations and developments, such a module can comprise hardware and/or software means. The device can also be constituted by several distinct elements or modules which may be hardware and/or software modules interacting with one another.

The invention also relates to a base station of a radiocommunications network characterized in that it comprises such a control module.

Such a base station can also be powered by solar and/or wind electrical energy production means, the approach of the invention making it possible to optimize consumption, especially as a function of the production capacity of these means and/or a corresponding battery charge.

The invention also relates to a signal emitted by a base station of a radiocommunications network to at least one terminal, multiplexing data in time intervals each having at least one synchronization portion and at least one data portion organized into time-distributed and frequency-distributed resource blocks.

According to this aspect of the invention, said data portion comprises, for at least some of said time intervals:
- at least one active sub-portion grouping together data units intended for at least one terminal in at least one sub-portion of said data portion; and
- at least one inactive sub-portion, during at least a part of which no sending whatsoever takes place.

The invention also relates to a configuration signal defining, for a given base station, said active and inactive sub-portions, and capable of being exchanged with at least one neighboring base station and/or at least one controller, controlling a set of base stations, and/or at least one user terminal. The configuration, as the case may be, can be provided by the controller or by the base station.

4 LIST OF FIGURES

Other features and advantages of the invention shall appear from the following description, given by way of an indicative and non-exhaustive example and from the appended figures, of which:

FIGS. 9a to 9c illustrate an optimizing of active sub-portions in a case implementing two types of data to be transmitted.

5 DETAILED DESCRIPTION OF THE INVENTION

Figure 1A:
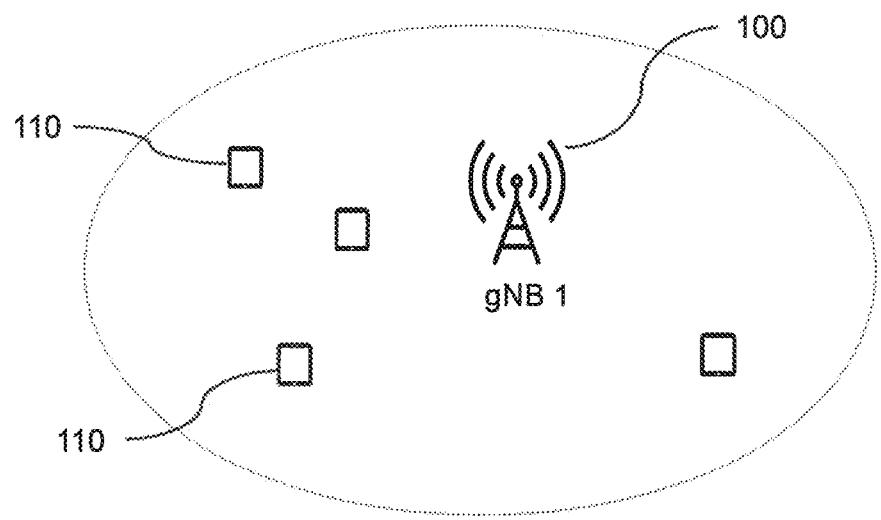
FIGS. 1a and 1b illustrate terminals connected to a base station as well as time and frequency multiplexing of the data exchanged between the terminals and the base station obtained by application of a known technique.

5.1 Glossary time interval (120): structural element of the signal emitted by a base station, starting with a synchronization portion (periodicity of the "SS-bursts" for 5G);

time portion, hereinafter and for the sake of simplicity also called a "portion": part, or window, of a time interval, namely:

synchronization time portion (150): part of a time interval, for example "SS blocks" according to the 3GPP standard, comprising synchronization signals 130 and, as the case may be, other pieces of signaling information and as the case may be user data (the "SS-blocks" are not transmitted on all the time/ frequency resources of this window and user data can be scheduled in this window);

user data time portion (160), here below and by simplification also called "data portion": second part of a time interval carrying data intended for the different terminals with reference to the base station. These data can especially include data directly related to communications (voice, sound, images, data in the broad sense) as well as elements of a dedicated signaling (channel estimation, setting up of connections, etc.);

time sub-portion, here below and for simplicity also called "sub-portion": part of a user data time portion, namely:

active tome sub-portion (300*a*): part grouping together the user data to be broadcast;

inactive time portion (300*b*): part containing no user data during which the base station can be put into sleep mode;

resource block (140): elementary time-frequency block carrying data intended for a terminal; time slot (170): basic time element of a data portion, or timestamp of a resource block in the time-frequency grid, for example a "TTI" or "time slot" for 5G.

5.2 General Principle of the Invention

In all the figures of the present document, the identical elements and steps are designated by a same reference.

The technique described relates to the control of a base station, or a set of base stations, of a radiocommunications network multiplexing data in time intervals each having at least one synchronization portion and at least one data portion organized in time-distributed and frequency-distributed resource blocks.

More particularly, the general principle of the technique described relies on a grouping, for at least certain of the time intervals, of all the resource blocks carrying data intended for at least one terminal in at least one sub-portion of the data portion, called an active sub-portion, so as to prepare at least one sub-portion, in the user data portion, that contains no used resource blocks called an inactive sub-portion.

This means that the base station can be put on sleep-mode for at least a part of the duration of the inactive sub-portion or sub-portions, making it possible to save on energy while at the same time limiting the impact on the general service obtained. In the present description, the sleep mode is maximized and applied throughout the duration of the inactive sub-portion, and times of passage into sleep-mode and wake-mode, which generally take place during the inactive sub-portion, are considered to form part of the duration of being put into sleep mode. According to another interpretation, these transitory phases can be considered, strictly speaking, to be not part of the sleeping time.

The invention thus makes it possible to dynamically optimize the characteristics of the time intervals and therefore the duration of putting a base station or a set of base stations into sleep-mode, especially to follow the developments in the network, for example the number of sessions, the QoS (quality of service) and/or energy constraints The optimization can be local, i.e. decided independently for each base station (gNB), or it can be centralized with a joint management of several gNBs, especially through SON (self-organizing network) type mechanisms. Several values of N can also be defined to differentiate the traffic, depending on the QoS required and/or the type of user. It is possible to take account for example of:

a differentiation between "premium" and "economical" class fixed rates;

a differentiation between priority data (for example medical services, emergency calls) and "best effort" traffic (for example downloading of a file).

This is for example illustrated in FIGS. 9*a* to 9*c* commented upon here below.

The solution of the invention can thus be integrated into a "network slicing" context. This concept is a key point of 5G which enables the RAN and core configurations to be adapted jointly in order to attain a specific QoS goal and therefore provide communications for applications having very different constraints, for example those related to "mobile broadband" or the IoT (Internet of Things).

5.3 Reminder: The Structure of the 5g Signal

Figure 1B:
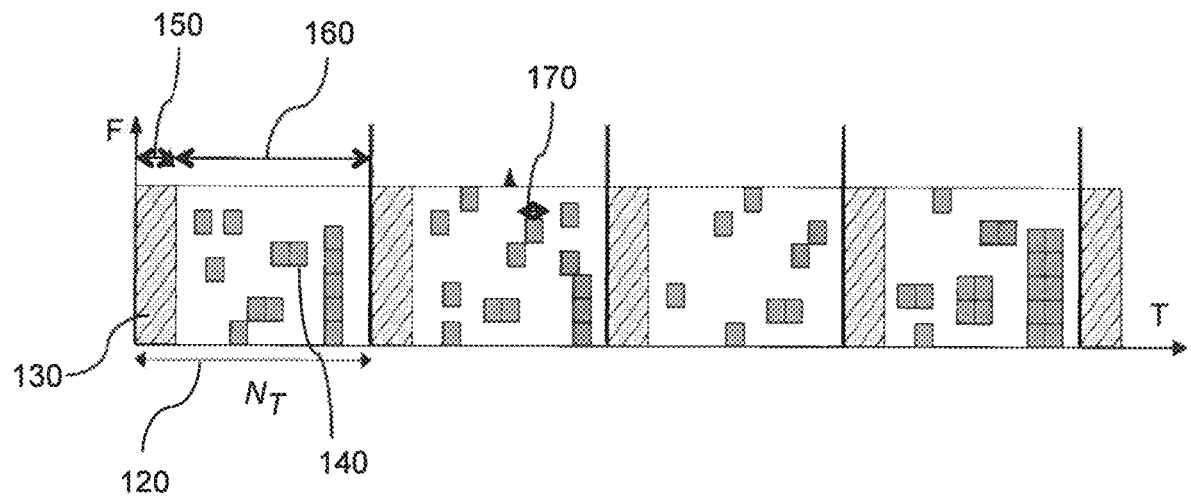

Referring now to FIGS. 1*a* and 1*b*, we describe the time and frequency multiplexing, according to a known technique, of data exchanged between the terminals 110 and a base station 100 of a radiocommunications network.

More particularly, the terminals 110 and the base station 100 exchange data according to the 5G standard currently being standardized within the 3GPP. In other embodiments, the terminals 110 and the base station 100 exchange data according to other protocols, for example according to the LTE (ILong-Term Evolution) protocol or LTE-Advanced protocol.

Back to FIG. 1, the base station 100 broadcasts, at regular intervals, signals dedicated to the maintenance of the network, especially synchronization signals (for example PSS or Primary Synchronization Signals and SSS or Secondary Synchronization Signals) and signals notifying the general parameter-setting for the cells (for example the PBCH or Physical Broadcast Channels). The base station 100 also transmits signaling on user data such as pilot data or messages for the management of the connections.

The synchronization signals 130 are grouped together in a portion 150 called a synchronization portion. These synchronization portions 150 define time intervals 120 each comprising a synchronization portion 150 and a data portion 160.

More particularly, according to the prior art, the resource blocks 140 (i.e. the time-frequency blocks) intended for exchanging data between the terminals 110 and the base station 100 can be distributed throughout the data portion 160 as a function of the implementing of a scheduler and as a function of the arrival of these data or of the associated signaling.

Thus, according to the known technique, the base station 100 must remain in operation constantly in order, on the one hand, to periodically broadcast the synchronization signals 130 in the synchronizing portions 150 (which can also contain user data and/or other signaling information) and, on the other hand, receive or send resource blocks 140 conveying data from the terminals 110 in the data portions 160. According to known techniques, such resource blocks 140 can be assigned to any unspecified time slot 170 in the data portion 160. Here, in the case of 5G, the time slot 120 is understood to mean the timestamp of a block of resources 140 in the time-frequency multiplexing grid of the blocks in question, as stipulated by the radiocommunications standard considered.

5.4 Putting to Sleep

Figure 2:
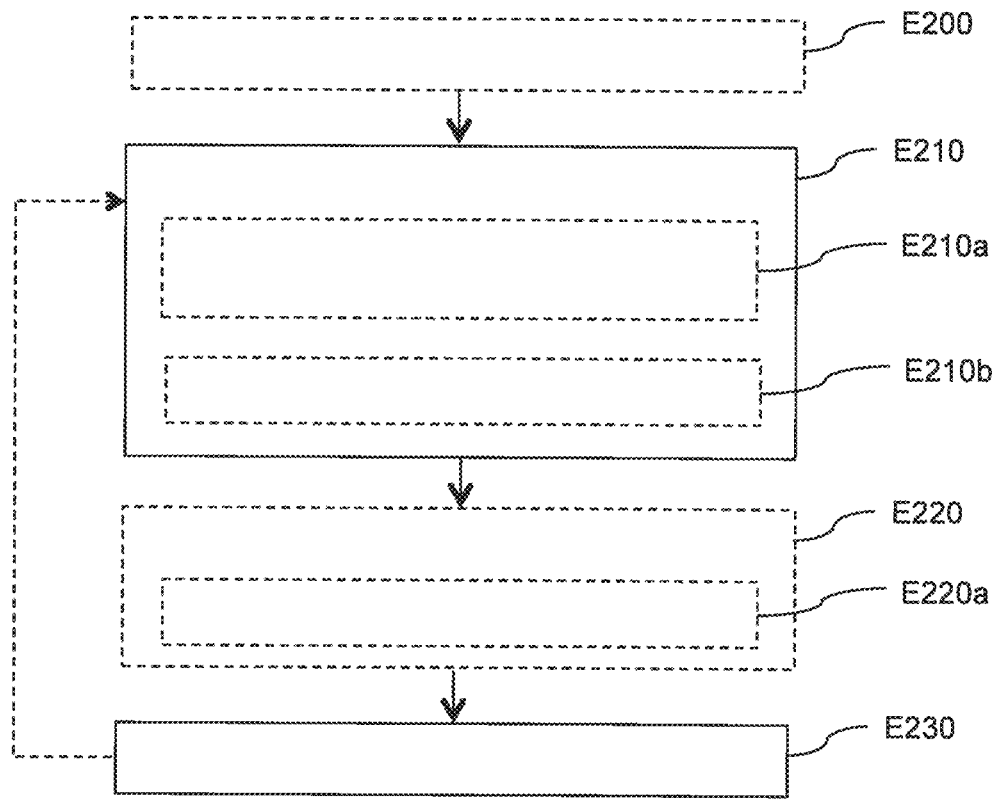
FIG. 2 illustrates steps of a method for controlling the base station of FIG. 1a according to one embodiment of the invention.

Referring now to FIG. 2, a description is provided of the steps of a method for controlling the base station 100 according to different embodiments of the invention. The steps in question as well as their implementation in the different embodiments considered are also illustrated by examples described with reference to FIGS. 3a and 3b, 4, 5a to 5c, 6a and 6b and 7a to 7c.

Thus, for at least certain time intervals 120, at a step E210 for optimizing the use of the resources, called a grouping step (FIG. 2), the set of resource blocks 140 carrying data intended for at least one terminal 110 is grouped in at least one sub-portion of the data portion 160, called an active sub-portion 300a, so as to prepare, in the data portion 160, at least one sub-portion containing no used resource blocks 140, called an inactive sub-portion 300b.

As a result, the signal sent out by the base station 100 comprises, for the time interval 120 considered, and more specifically, for the data portion 160, at least one active sub-portion 300a grouping together the data to be transmitted and at least one inactive sub-portion 300b, during at least one part of which no sending takes place.

Thus, during a step E230 (FIG. 2), the base station 100 is put into sleep-mode during at least a part of the duration of the inactive sub-portion or sub-portions 300b.

As a result, a sleep-mode setting cycle, during which the consumption of the base station 100 is reduced (no data sending), is obtained during a part of the duration of each time interval 120 in question.

Besides, the terminals 110 can remain served by the base station 100 during such sleep-mode setting cycles. As a result, a traffic offloading from the base station 100 to another base station of the network can be avoided.

Figure 3A:
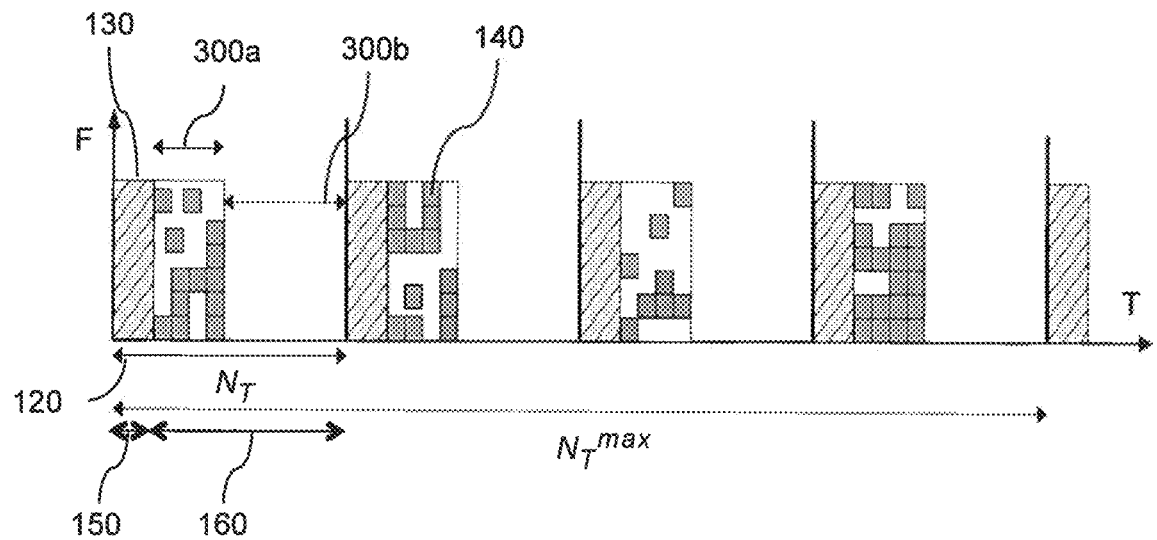
FIGS. 3a and 3b illustrate the time and frequency multiplexing of the data exchanged between the terminals and the base station of FIG. 1a obtained by application of the method of FIG. 2.
Figure 3B:
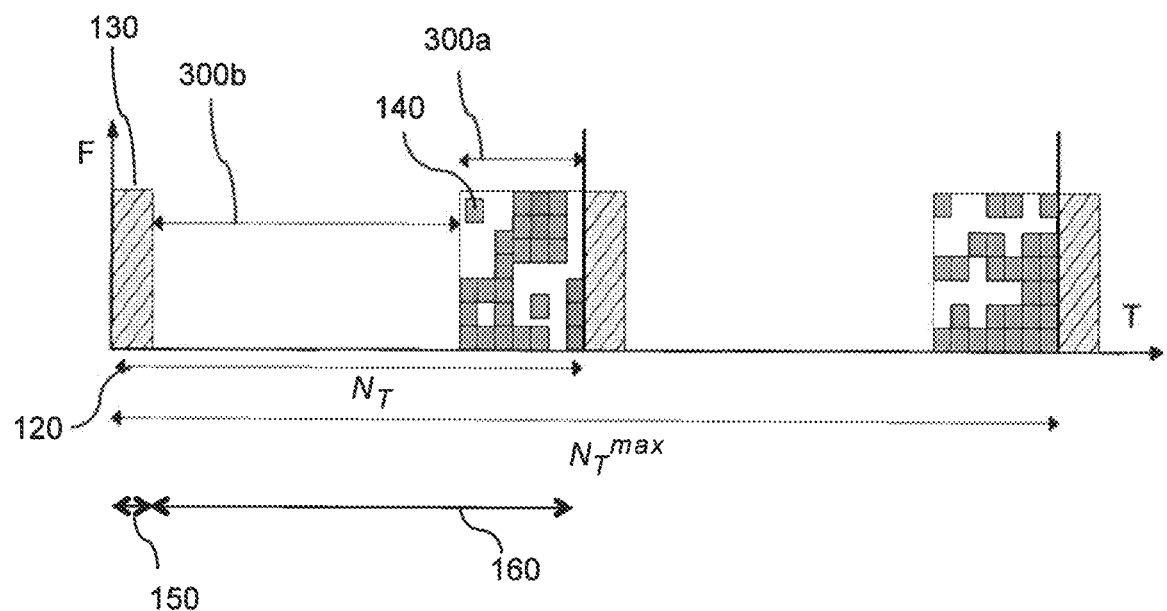

In the embodiment illustrated in FIGS. 3a and 3b, the active sub-portion 300a is placed, in time, immediately before (FIG. 3b) or after (FIG. 3a) a synchronization portion 150. As a result, the duration of the inactive sub-portion 300b is maximized as well as the corresponding sleep-mode setting duration.

As a variant, this active sub-portion 300a could include two parts, one just before and one just after the synchronization portion. In every case, the synchronization portions and the active portions are contiguous, to form a single duration during which the base station is out of sleep mode and to maximize the inactive period during which it is in sleep mode.

In the embodiment illustrated in FIG. 2, the step E210 for optimizing the use of the resources (leading to a grouping of user data) comprises:
  a step E210a for dividing into active sub-portions and inactive sub-portions, comprising the determining of a maximum number N of necessary consecutive time slots corresponding to the inactive sub-portion 300b (and therefore a number $N_T-N$ of time slots for the active sub-portion 300a); and
  a step E210b of updating, via a given signaling portion, the distribution of resource blocks in the active sub-portion 300a, and therefore sub-portions 300a, 300b for a current time interval and/or at least one following time interval.

This operation of distribution as such is carried out by a scheduler. It is adapted to the duration selected for the active sub-portion. Depending on the implementations, the step E210a can be integrated or not integrated into the scheduler and/or into the corresponding scheduling algorithm.

Thus, depending on the variants considered, the duration of the inactive sub-portion is updated, for implementation either directly during the current time interval (i.e. during the time interval that comprises the given synchronization portion 150) or during a following time interval depending, for example, on operational conditions of the base station 100.

In variants, such operational conditions can be related to working parameters belonging to the group comprising:
  a reception handover request sent by at least one terminal 110 to the base station 100;
  a signaling of a request for starting or ending communications sent by at least one user terminal 110 to the base station 100; and
  an external parameter influencing the radio-broadcasting capacity of the base station 100 (for example weather forecasts for a base station powered with electricity by solar panels).

The step E230 for putting into sleep mode (according to any one of the embodiments mentioned here above) is looped back to the step E210 for grouping (according to any one of the embodiments mentioned here above). As a result, the method for controlling a base station is successively applied to a sequence of time intervals 120 so as to follow the progress in time of the operational conditions of the base station 100.

In certain embodiments, this development can be taken into account remotely by a controller controlling a plurality of neighboring base stations, and/or by remote control means housed for example in a "cloud" and/or a data management center or data center.

It is indeed noted that the architectures of the networks converge towards a "virtualization", i.e. that the base station as perceived today could in the future essentially resemble a single antenna, most of the functions (relating for example to the management of connections and of QoS) being transferred to data centers. Ultimately, there will be a virtual base station which will be physically sub-divided into RRH (remote radio heads) and BBU (baseband units).

Thus, the method, the device or the base station can be constituted by several distributed elements implemented in a hardware and/or software manner.

5.5 Illustration of the Gain in Energy

Figure 4:
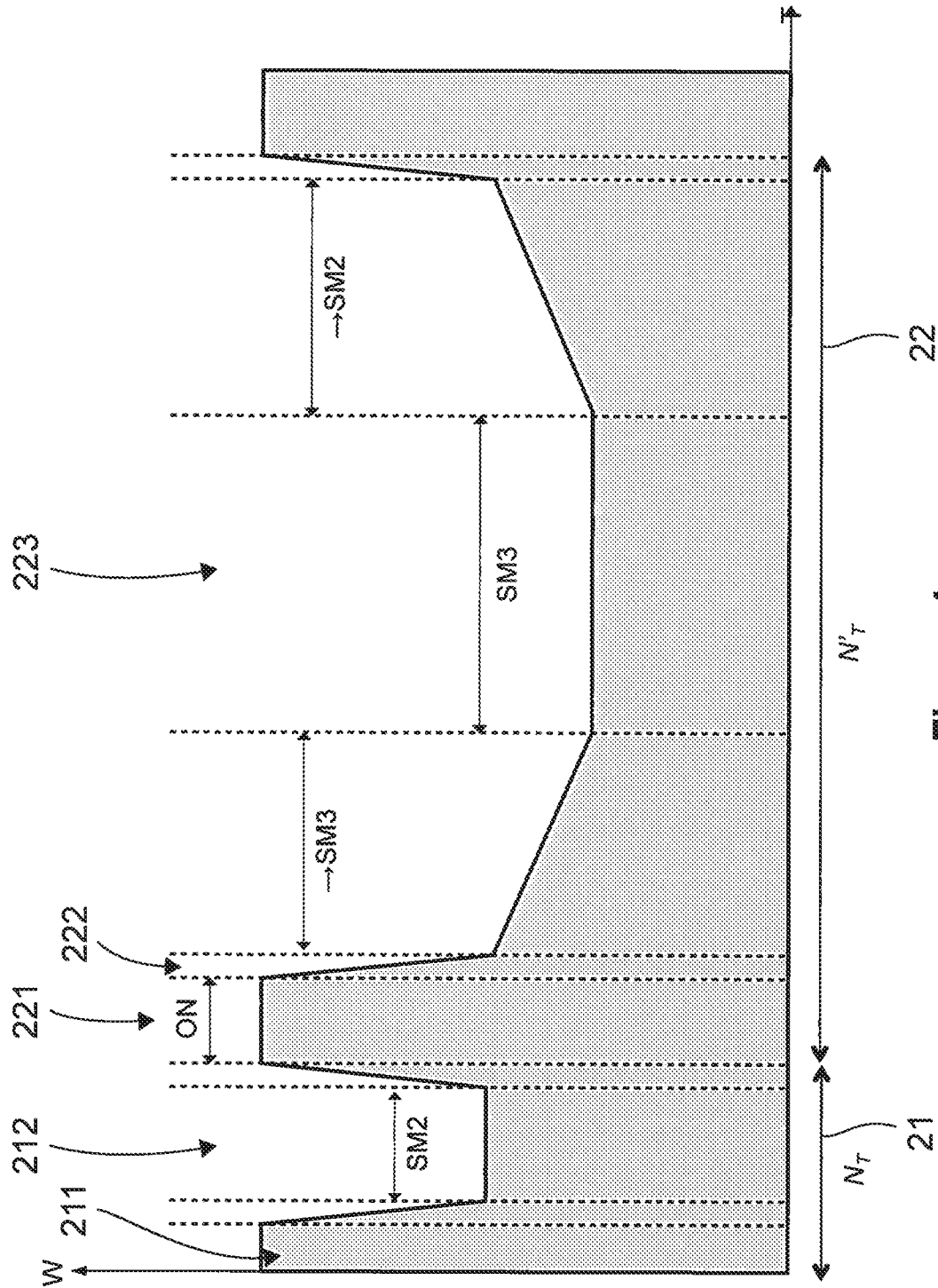
FIG. 4 illustrates an example of a profile of power consumed by the base station of FIG. 1a when it applies the method of FIG. 2.

More particularly, the quantity of energy saved during a sleeping period is not simply linear with the duration of the sleep mode in question. It can be seen that lengthy sleep periods make it possible to attain more economical modes of operation by enabling the suspension of the power supply to components requiring long periods of deactivation and reactivation as illustrated in FIG. 4.

Indeed, in practice the operating power of the components (RF module, decoder, etc.) of the base station 100 can vary between 490 W (signaling alone) and 750 W (full charge). However, putting these components to sleep and waking them up again them are not instantaneous and the possibilities of sleep mode are greatly limited by the time of transition (deactivation time+activation time).

The analysis of the consumption of base stations has made it possible to define four sleep modes (SM) (cf. "*A Flexible and Future-Proof Power Model for Cellular Base Stations*", Björn Debaillie, Claude Desset, Filip Louagie, *IEEE VTC Spring* 2015:
  a) SM1: Relates mainly to the deactivation of the power amplifier, and its transition time is 71 µs ($\approx$1 OFDM symbol) only. The operating power of a base station in this sleep mode is estimated at 157 W.
  b) SM2: For a transition time of 1 ms, the operating power is reduced to 42.9 W.

c) SM3: In this sleep mode, most of the components are deactivated. Requiring 10 ms of transition time, this mode limits the power to 28.5 W.

d) SM4: This mode almost totally turns off the base station 100 and requires 1 second of transition. The only functions that remain active are the wake-up functions on the backhaul network and the operating power is equal to 24.3 W.

As illustrated in FIG. 4, for a gDTX cycle 21 of 10 ms and for an active period 211 of 5 ms, the gNB can attain SM2 (212) and the mean power consumed is for example equal to:

(750 W×5 ms+42.9 W*4 ms+(750−42.9)/2 W*1 ms)/10 ms=431.8 W (the last term corresponds to the energy consumption during the transition period).

For a cycle gDTX 22 of 40 ms and an active period 221 of 20 ms, the gNB can pass into SM2 (222), then SM3 (223), and the average power consumed is for example equal to:

(750 W×20 ms+28.5 W*9 ms+(750−42.9)/2 W*ms+ (49.2−28,5)/2 W*10 ms)/40 ms=392.8 W 5.6 Variation of the Duration of the Time Intervals As is stipulated in the 5G standard under development, at a step E220 (FIG. 2) the duration of the time intervals 120 can be modified so as to be for example also adaptable to the above-mentioned operational conditions of the base station 100.

Such a flexibility optimizes especially the duration of the sub-portion 300b of inactivity and therefore ultimately the energy consumption of the base station 100. In other words, the invention proposes, according to this approach, to optimize on the one hand the duration of the active sub-portion in limiting it as far as possible (to $N_T$− N time slots), and on the other hand the duration of the inactive sub-portion by increasing it ($N_T$ time slots for the time interval). The implementing of the invention relies, according to this embodiment, on a pair having the value (N, $N_T$) to be optimized.

In other embodiments not shown in FIG. 2, the active or inactive sub-portions 300a, 300b and/or the duration of the time intervals 120 are however fixed so as to simplify the management of the network.

Lengthening the duration of the time intervals 120 enables the passage into particularly economical sleep modes (SM2, SM3 or even SM4), and provides substantial gains in energy (cf. "*Advanced Sleep Modes and their impact on flow-level performance of 5G networks*", Fatma Ezzahra Salem, Azeddine Gati, Zwi Altman, Tijani Chahed).

The base station 100 can announce the organization of its intervals (values N and $N_T$) and its sleep-mode cycle to the terminals 110 in the vicinity. Thus, the terminals 110 in question can synchronize their own sleep-mode cycles and especially their DRX cycles. This announcement can be conveyed for example via an SIB (system information blocks) message. Thus, energy gains are obtained both for the base station and for the terminals 110. We then arrive at an intermittent cell where the terminals 110 and the base station 100 alternate between periods of activity and inactivity. Such a cell is therefore visible only during the synchronization portions 150 and the active sub-portions 300a.

According to the embodiment of FIG. 2, the step E220 for modifying the duration of the time intervals 120 defines, for the intervals in question, a number of time slots that is an integer sub-multiple of a maximum number $N_T^{max}$ of time slots (for example in the 5G standard, the PSS, SSS and PBCH signals are grouped together in blocks that are transmitted with a periodicity reconfigurable at the following values: 5, 10, 20, 40 ms . . . ).

Thus, whatever the duration of the time intervals 120, selected from among the authorized durations, a broadcasting of the synchronization signals 130 at fixed and predetermined instants 500 can be obtained periodically (i.e. at least at every $N_T^{max}$ time slots starting from a given time reference).

Figure 5A:
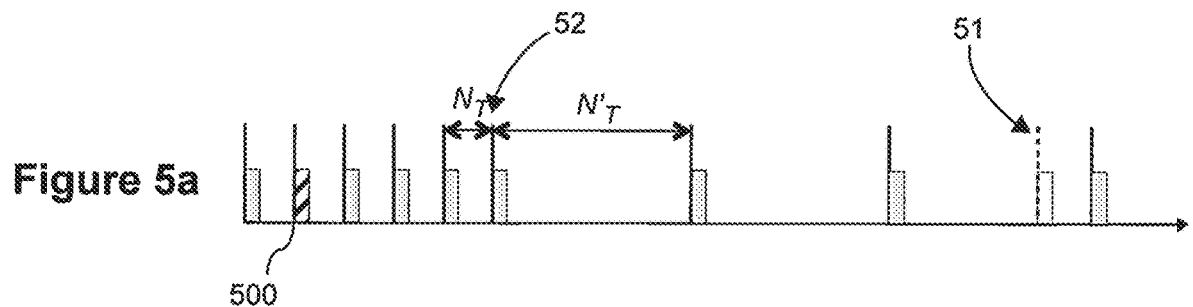
FIGS. 5a, 5b and 5c illustrate the benefit of a broadcasting of the synchronization signals by the base station of FIG. 1a at fixed periodic instants.
Figure 5B:
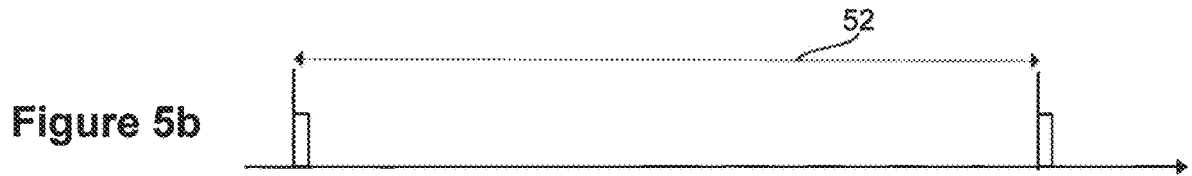
Figure 5C:
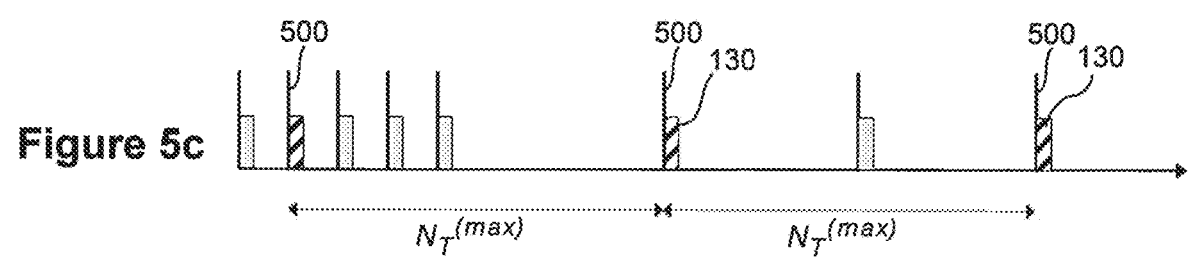

For example, as illustrated in FIGS. 5b and 5c, through such a broadcasting of the synchronization signals 130 at the fixed instants 500 in question, it is possible to make the active period of a terminal coming out of an extensive sleep period (for example an eDRX cycle of one or more hours) coincide with an active portion of the time interval of the base station, even if the duration of this interval has been modified.

Figure 6A:
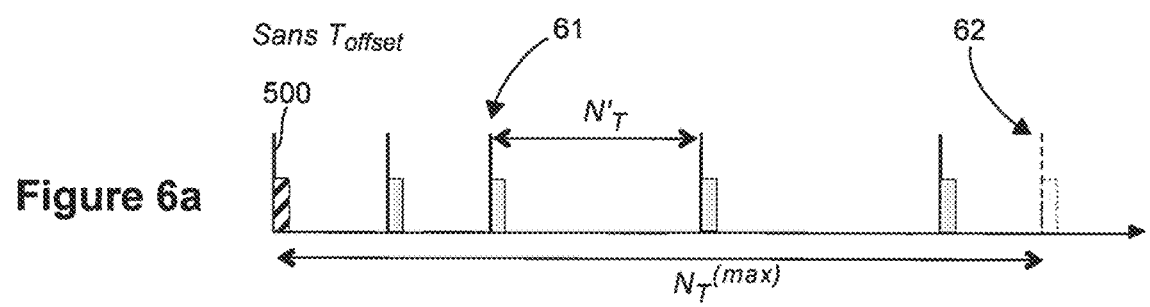
FIGS. 6a and 6b illustrate the application of a time offset before taking account of the modified duration of the time intervals according to one embodiment of the invention in order to maintain the periodic broadcasting of the synchronization signals as illustrated in FIGS. 5a, 5b and 5c.

However, as illustrated in FIG. 6a, it can happen that a modification 61 of the duration of the time intervals leads to an offset 62 in the periodicity of broadcasting of the synchronization signals even when the current duration and the modified duration are selected from among the above-mentioned authorized durations.

Thus, in order to maintain broadcasting of the synchronization signals at the fixed instants 500, the step E220 for modifying the duration of the time intervals 120 includes a step E220a (FIG. 2) for adapting the duration of the current inactive sub-portion 300b (either an increase or a decrease of the duration of the inactive sub-portion).

Figure 6B:
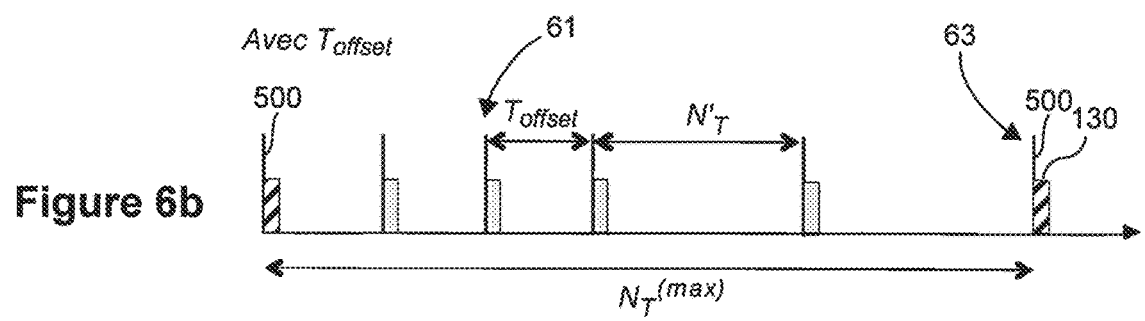

According to the example illustrated in FIGS. 6a and 6b, the introduction of an additional correction duration, $T_{offset}$, for a time interval called a transition interval maintains the broadcasting 63 of the synchronization signals at the fixed instants 500 in question despite the changing of the duration of the time intervals 120 from the current duration of $N_T$ time slots to the modified duration of $N'_T$ time slots.

In other examples not shown, maintaining the broadcasting of the synchronization signals at the fixed instants 500 can be obtained by reducing the duration of the inactive sub-portion.

In other embodiments not shown in FIG. 2, the step E220 for modifying the duration of the time intervals 120 does not include any step E220a for adapting the duration of the current inactive sub-portion 300b. Instead, in order to maintain the broadcasting of the synchronization signals at the above-mentioned fixed instants 500, the modified number $N'_T$ of time slots replaces the current number $N_T$ of time slots after a given number q of additional applications of the control method implementing the current number $N_T$ of time slots in a series of q successive time intervals 120 following the current time interval 120 (i.e. following the time interval 120 during which the modified number $N'_T$ is obtained).

Thus, the broadcasting of the synchronization signals at the above-mentioned fixed instants 500 is preserved in a simple manner through the implementing of additional iterations of the method according to the invention on the basis of the current number $N_T$ of time slots.

For example, in one particular implementation, said base station broadcasts said synchronization portions at least every $N_T^{max}$ time slots starting from a given time reference, and, at a given instant, updates the number of time slots contained in a time interval. The current number of time slots $N_T$ and the modified number of time slots $N'_T$ are such that $N_T^{max}=k*N_T$ and $N_T^{max}=m*N'_T$, k and m being integers, and the updating takes place during a $p^{th}$ successive application of the control method implementing said current number $N_T$ of time slots. The modified value $N'_T$ is applied only after q additional time intervals constituted by $N_T$ time slots, and for the K remaining time intervals. K and q are two integers such that $kN_T=(p+q)N_T+KN'_T$ and $mN'_T=(p+q)N_T+KN'_T$. K=0 and q=k-p if such integers do not exist.

Figure 7A:
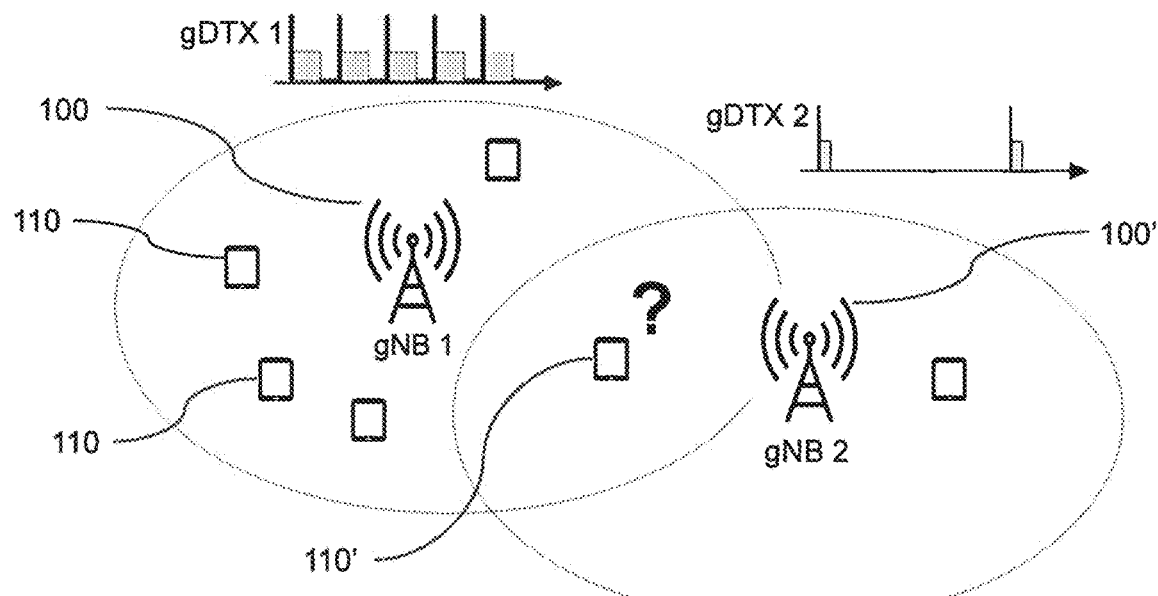
FIGS. 7a, 7b and 7c illustrate different strategies of connection of a new terminal to a base station according to different embodiments of the invention.
Figure 7B:
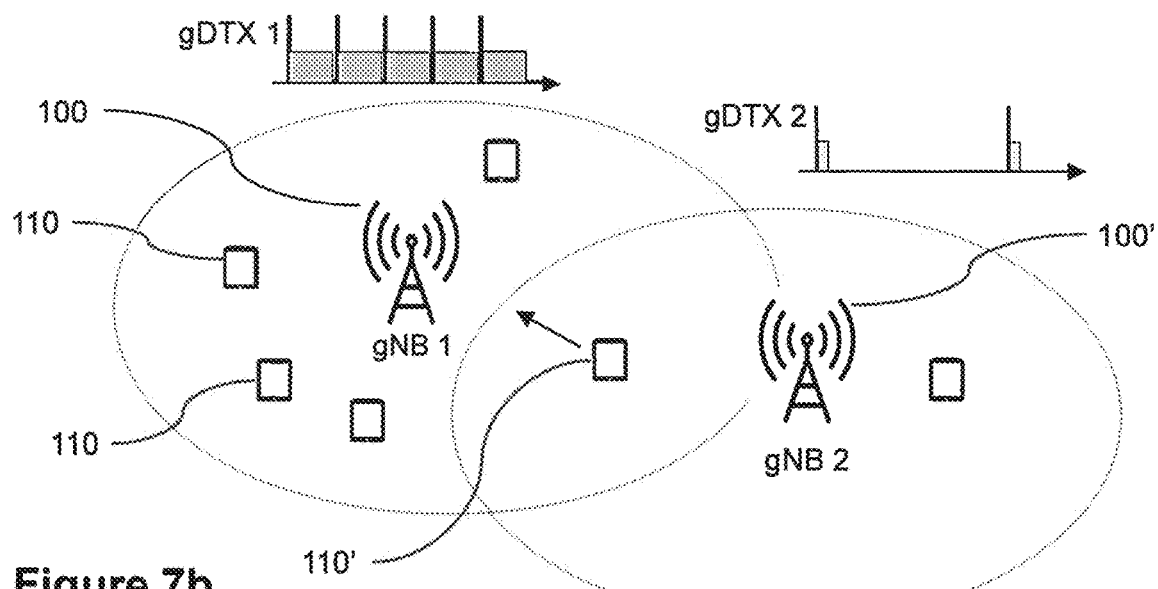
Figure 7C:
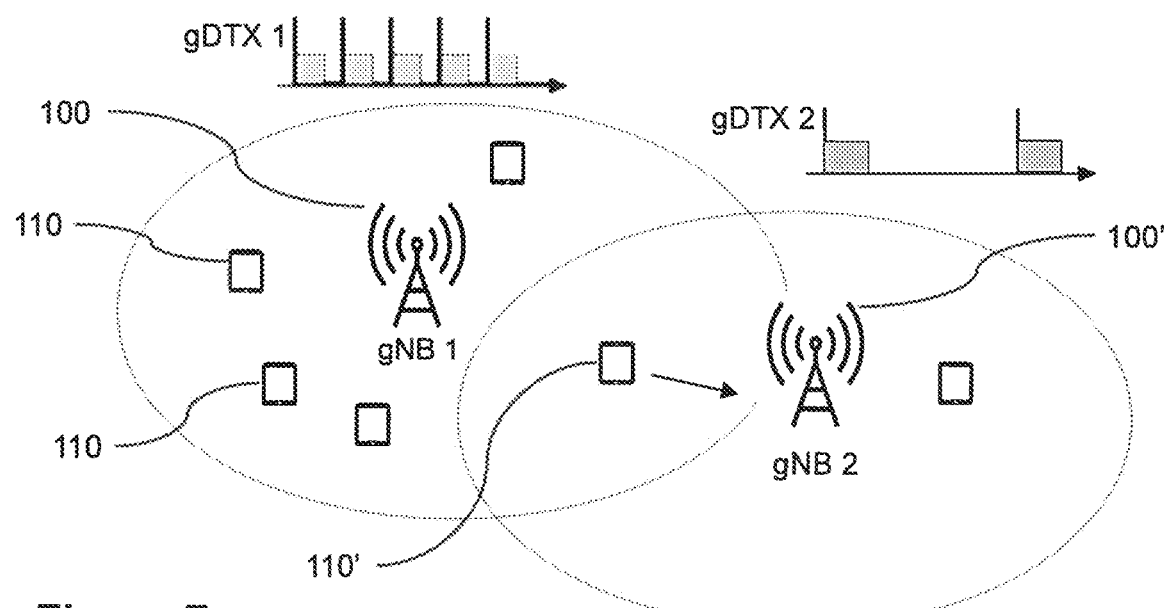

5.7 Optimization Taking Account of at Least One Other Neighboring Base Station Returning to FIG. 2, and with reference to FIGS. 7a to 7c, when a terminal 110 makes for example a request to the network for starting or ending communications, or for transfer to another base station, and when this connection can be managed by the base station 100 or at least another base station 100', the method according to the invention further comprises a step E200 for selecting a base station for the terminal 100', that takes into account especially of the distribution between the active sub-portions 300a and inactive sub-portions 300b in at least one of said base stations 100, 100'. Thus, a centralized optimizing of the cycles for putting the base stations 100 and 100' into sleep-mode make it possible to combine the management of the cycles in question in taking account of possible traffic offloading from one base station to another.

For example, as illustrated in FIG. 7b, the terminal 110' can be handed over to the base station 100, which is already reasonably active, in order to leave the base station 100 in an advanced sleep state, for example SM2, SM3 or SM4.

On the contrary, as illustrated in FIG. 7c, if additional traffic prevents the base station 100 from implementing a grouping of resource blocks 140 so as to obtain an inactive sub-portion 300b to be able to keep itself in a sleep state, it can be preferable to allow the terminal 110' to be served by the base station 100' so as to be able to obtain a sleep-mode cycle for each of the two base stations 100, 100' (cf. the respective sleep cycle profiles gDTX1 and gDTX2).

As already mentioned, the corresponding decisions can be taken by a controller controlling several base stations and/or in a virtualized way, for example via a data center.

5.8 Possibility of Adaptation as a Function of Type of Traffic

According to one aspect of the invention, it is possible to adapt or rather to differentiate the values N and $N_T$ according to the type of traffic. The term "type of traffic" can be understood to mean a differentiation by required quality of service or QCI (QoS Class Identifier—4G/5G), by network slicing, but also for example in differentiating the signaling user data (for example the ACK). A base station manages several types of traffic and therefore adapts its gDTX cycle to each use and not to the use with the most constraints.

An example of adaptation is illustrated in FIGS. 9a to 9b. FIG. 9a illustrates two distinct types of traffic, the first (91) requiring low latency (high periodicity) but few resources while the second (92) by contrast requires more resources (namely a smaller N), but with a lower time limit constraint. To transmit all the corresponding data corresponding to the two traffics, a direct approach (without differentiation) would lead to the situation illustrated in FIG. 9b: the lowest values N and $N_T$ are chosen, thus leading to a reduced sleeping time. By contrast, in taking into account the differentation of the contents, it is possible to optimize the transmission as illustrated in FIG. 9c to obtain a far greater sleeping time. For example, the value $N_T$ of the first type of traffic (the lowest type) is kept but the following are transmitted alternately:

active sub-portions 93 containing data on both traffics 91 and 92; and active sub-portions 94, containing only data on traffic 91.

Thus, the QoS (quality of service) required for each type of traffic is met while increasing the sleeping time.

5.9 Implementing of Method in a Technical Device

Figure 8:
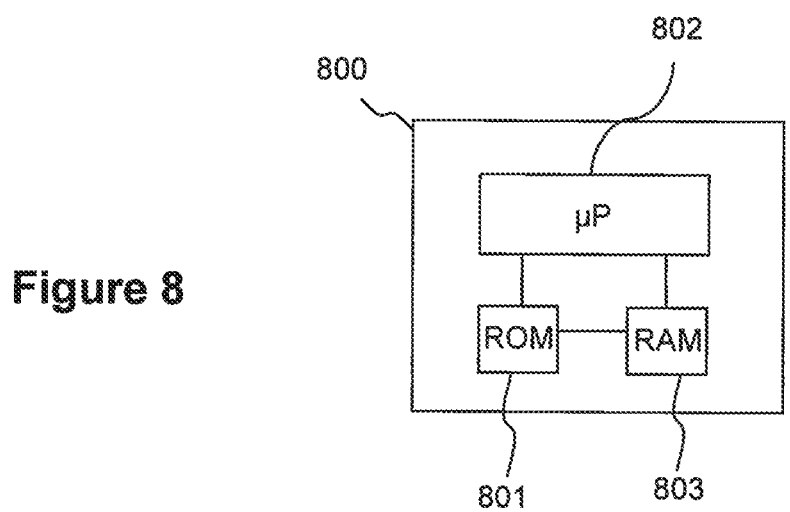
FIG. 8 presents a simplified example of a structure of a module intended to implement the control method of FIG. 2.

FIG. 8 is a schematic view of an example of a module 800 for controlling the base station 100. Such a module 800 makes it possible to implement the control method of FIG. 2. The module 800 herein comprises a random-access memory or live memory 803 (for example a RAM), a processing unit 802 equipped for example with a processor and driven by a computer program stored in a read-only memory (for example a ROM or a hard-disk drive). At initialization, the code instructions of the computer program are for example loaded into the random-access memory 803 and then executed by the processor of the processing unit 802.

This FIG. 8 illustrates only one particular way among several possible ways of making the technical means included in the module 800 so that it carries out at least certain steps of the control method described in detail here above, for example with reference to FIG. 2 (in any one of the different embodiments). Indeed, these steps can be performed without distinction on a reprogrammable computing machine (a computer, a processor or a microcontroller) executing a program comprising a sequence of instructions or on a dedicated computation machine (for example a set of logic gates or any other hardware module). Should the means included in the module 800 be made with a reprogrammable computing machine, the corresponding program (i.e. the sequence of instructions) could be stored in a detachable or non-detachable storage medium, this storage medium being partially or totally readable by a computer or a processor. It can also be downloaded via any adapted transmission means.

In certain embodiments, such a module 800 is included in the base station 100.

In other embodiments, the module according to the invention can be a hardware program embedded in a scheduler, the general driving hardware of the base station or it can be a dedicated hardware. The module can comprise hardware elements and/or software elements.

Besides, the invention can be implemented partly outside a base station. In particular, the operations for determining durations of active and inactive sub-portions can be achieved, as the case may be, by the base station or by a controller controlling several neighboring base stations and generally optimizing the durations of active and inactive sub-portions of each base station, in taking account of different aspects (for example, the energy reserves of each cell). The method, the computer program product and/or the module can also be distributed between this controller and the base stations.

5.10 Compatibility with DRX (Discontinuous Reception) of UEs (User Equipment) and Management of IoT (Internet of Things) Devices The proposed solution does not hinder DRX, eDRX and PSM cycles (in energy savings mode) used especially for the IoT devices. Indeed:

1) Contrary to the techniques proposed previously (especially in the context of the IoT), the gNB does not adapt its gDTX sleep cycle to the DRX cycles of the UEs, but announces its gDTX cycle to the UEs in order to enable them to synchronize their DRX cycle. Thus, the implementing of the gDTX cycle ensures gains in terms of energy both for gNBs as well as for the UEs.
2) The DRX/gDTX synchronization can be done by adjusting the parameters of the DRX cycle, as defined by the 3GPP standard. For example, for a UE in RRC_CONNECTED mode, the "OnDuration" timer is fixed at the maximum at $N_T - N$ time slots and the value for "DRXShortCycle" is configured at $N_T$. The inactivity timer "DRX-InactivityTimer" can be set at zero so that UE immediately starts its DRX cycle. At the end of a "DRXShortCycleTimer" timeout (i.e. if no data has been received), the UE switches into a long cycle which can be configured in the same way.
3) The eDRX ("extended DRX) cycles and the PSMs ("power saving modes") are used mainly for the IoT devices and can constitute an obstacle to the optimizing of the parameters N and $N_T$. Indeed, an eDRX or PSM cycle of an IoT device can reach several hours. It is therefore possible that the gNB will have modified the time interval $N_T$ for the sleeping period of the IoT device and therefore that this device will be woken up during the inactive sub-portion of the gNB.
4) By ensuring a period of inactivity on a fixed base of $N_T^{(max)}$ time slots (for example 80 ms), the invention supports the implementing of the eDRX and PSM cycles. It is enough for the corresponding timers as well as the TAU ("Tracking Area Update") to be synchronized with the guaranteed periods of inactivity, i.e. that they should be equal to a multiple of $N_T^{(max)}$. Thus, a UE (Smartphone or IoT device) can go into a sleep-mode for $n \times N_T^{(max)}$ time slots, $\forall n \in \mathbb{N}$, and be sure of finding the gNB in activity when it wakes up, whatever the modifications made to $N_T$ or N. In the particular case of the PSM, the arrival of data to be transmitted on the uplink also activates the waking up of the UE. It is thus submitted only to an additional maximum time lag of $N_T^{(max)}$ time slots.
5) A time offset ($T_{offset}$) can be used in the event of a modification of the parameter $N_T$. This for example amounts to delaying the application of a new value for $N_T$ by a few cycles to ensure an active sub-portion every $N_T^{(max)}$ time slots. This offset can also be used to facilitate the transition between the announcement of a new cycle and its effective application with the UEs.

The invention claimed is:

1. A method implemented by a device and comprising:
controlling a base station of a radiocommunications network multiplexing data in time intervals, each time interval comprising at least a synchronization time portion and at least a user data time portion organized in time-distributed and frequency-distributed resource blocks, each time interval being formed of a plurality of time slots, wherein the controlling comprises, for at least one of the time intervals:
dividing said user data time portion into at least two sub-portions, including an active time sub-portion, capable of grouping together resource blocks to be sent out, and a single inactive time sub-portion that contains no resource blocks used, said active time sub-portion being placed in time immediately before and/or after a synchronization time portion, the synchronization time portion and the active time sub-portion being contiguous to form a time duration during which the base station is out of sleep mode so as to maximize the single inactive time sub-portion between two consecutive synchronization time portions and during which the base station may be put in the sleep-mode;
putting said base station into sleep-mode for at least one part of a duration of said inactive time sub-portion; and
modifying a total duration of said at least one time interval, comprising modifying a number of the time slots forming said at least one time interval so as to be an integer sub-multiple of a maximum number $N_T^{(max)}$ of time slots, said maximum number $N_T^{(max)}$ of time slots corresponding to a maximum duration between two consecutive synchronization time portions.

2. The method according to claim 1, wherein a number of time slots forming said inactive sub-portion and/or the number of time slots forming said at least one time interval is set by taking into account at least one of the pieces of information belonging to at least one of the following :
guaranteed service time;
type of traffic to be transmitted;
electrical energy availability.

3. The method according to claim 1, wherein the method comprises, after modifying the number of time slots forming the at least one time interval, adapting a duration of a current inactive sub-portion.

4. The method according to claim 1, wherein the method comprises, after modifying the number of time slots forming said at least one time interval, delaying application of a new duration of the inactive sub-portion, the modified number of time slots replacing a current number of time slots only q time intervals later, q being determined so as to keep a broadcasting of the synchronization signals at fixed instants.

5. The method according to claim 1, wherein, when a terminal can be handled by said base station or at least another base station, the method implements choosing a base station to communicate with said terminal, taking into account a distribution between the active and inactive sub-portions of at least one time interval in at least one of said base stations.

6. The method according to claim 1, wherein the device is implemented by the base station.

7. A non-transitory computer-readable medium comprising instructions stored thereon, which when executed by a processor of a device configure the device to control a base station of a radiocommunications network multiplexing data in time intervals, each time interval comprising at least one synchronization time portion and at least one user data time portion organized in time-distributed and frequency-distributed resource blocks, each time interval being formed of a plurality of time slots, wherein the device is configured to, for at least one of the time intervals:
divide said user data time portion into at least two sub-portions, including an active time sub-portion, capable of grouping together resource blocks to be sent out, and a single inactive time sub-portion that contains no resource blocks used, said active time sub-portion being placed in time immediately before and/or after a synchronization time portion, the synchronization time portion and the active time sub-portion being contiguous to form a time duration during which the base station is out of sleep mode so as to maximize the single inactive time sub-portion between two consecutive synchronization time portions and during which the base station may be put in the sleep-mode;

put said base station into sleep-mode for at least one part of a duration of said at least one inactive time sub-portion; and modify a total duration of said at least one time interval, comprising modifying a number of the time slots forming said at least one time interval so as to bean integer sub-multiple of a maximum number $N_T^{(max)}$ of time slots, said maximum number $N_T^{(max)}$ of time slots corresponding to a maximum duration between two consecutive synchronization time portions.

8. A device for controlling a base station of a radiocommunications network multiplexing data in time intervals each time interval comprising at least one synchronization time portion and at least one user data time portion organized into time-distributed and frequency-distributed resource blocks, each time interval being formed of a plurality of time slots, wherein the device comprises:

a processor; and a non-transitory computer-readable medium comprising instructions stored thereon, which when executed by the processor configure the device to:

divide said user data time portion into at least two sub-portions, including an active time sub-portion capable of grouping together resource blocks to be sent out and a single inactive time portion not containing any used resource blocks, said active time sub-portion being placed in time immediately before and/or after a synchronization time portion, the synchronization time portion and the active time sub-portion being contiguous to form a time duration during which the base station is out of sleep mode so as to maximize the single inactive time sub-portion between two consecutive synchronization time portions and during which the base station may be put in the sleep-mode;

put said base station in sleep mode, for at least one part of a duration of said at least one inactive time sub-portion, and modify a total duration of at least one time interval, comprising modifying a number of the time slots forming said at least one time interval so as to bean integer sub-multiple of a maximum number $N_T^{(max)}$ of time slots, said maximum number $N_T^{(max)}$ of time slots corresponding to a maximum duration between two consecutive synchronization time portions.

9. The device according to claim 8, wherein the device is implemented in the base station of a group of base stations of the radiocommunications network.

* * * * *